United States Patent
Eichler, Jr. et al.

(10) Patent No.: US 6,928,498 B2
(45) Date of Patent: Aug. 9, 2005

(54) SYSTEM AND METHOD FOR IDENTIFYING OPEN PERIPHERAL COMPONENT INTERCONNECT (PCI) SLOTS

(75) Inventors: James L. Eichler, Jr., Bartonville, TX (US); Casey W. Irwin, Dallas, TX (US)

(73) Assignee: Efficient Networks, Inc., Dallas, TX (US)

( * ) Notice: Subject to any disclaimer, the term of this patent is extended or adjusted under 35 U.S.C. 154(b) by 365 days.

(21) Appl. No.: 09/773,850

(22) Filed: Jan. 31, 2001

(65) Prior Publication Data

US 2004/0225772 A1 Nov. 11, 2004

(51) Int. Cl.$^7$ .............................................. G06F 13/00
(52) U.S. Cl. ..................... 710/104; 710/10; 710/301
(58) Field of Search ............... 710/3, 8, 15, 17, 710/19, 46, 104, 109, 302, 301, 305, 10; 713/1

(56) References Cited

U.S. PATENT DOCUMENTS

| | | | | |
|---|---|---|---|---|
| 5,056,001 A | | 10/1991 | Sexton | 364/200 |
| 5,263,148 A | | 11/1993 | Jones, Jr. et al. | 395/500 |
| 5,819,053 A | * | 10/1998 | Goodrum et al. | 710/100 |
| 6,046,742 A | * | 4/2000 | Chari | 345/734 |
| 6,134,621 A | | 10/2000 | Kelley et al. | 710/126 |
| 6,185,677 B1 | | 2/2001 | Nijhawan | 713/2 |
| 6,269,417 B1 | * | 7/2001 | Mahalingam | 710/104 |
| 6,289,405 B1 | | 9/2001 | Movall et al. | 710/104 |
| 6,295,566 B1 | | 9/2001 | Stufflebeam | 710/103 |
| 6,397,268 B1 | * | 5/2002 | Cepulis | 710/8 |
| 6,542,939 B1 | | 4/2003 | Osten et al. | 710/15 |
| 6,772,252 B1 | * | 8/2004 | Eichler et al. | 710/104 |

OTHER PUBLICATIONS

"PCI IRQ Routing Table Specification," Microsoft Corporation, 8 pages. Version 1.0, Feb. 27, 1996. File Date: Dec. 3, 1998.*
"PCI IRQ Routing Table Specification," Microsoft Corporation, 8 pages, printed Oct. 5, 2001.
Patent Pending Application entitled, "System and Method for Assisting in Product Selection," currently entitled, "System and Method for Identifying a Product for use with a Computing Device," by Eichler et al., U.S. Appl. No. 09/773,684, 42 pages, filed Jan. 31, 2001.

* cited by examiner

Primary Examiner—Mark H. Rinehart
Assistant Examiner—Thomas J. Cleary
(74) Attorney, Agent, or Firm—Baker Botts L.L.P.

(57) ABSTRACT

In one aspect of the invention, a method for identifying an available peripheral component interconnect (PCI) slot in a computing device includes identifying at least one PCI slot in the computing device. The method also includes identifying any PCI devices coupled to a PCI bus. The PCI bus is coupled to the PCI slot. The method further includes determining if any of the identified PCI slots are available without requiring physical inspection of the PCI slots. An available PCI slot comprises an identified PCI slot that is not coupled to an identified PCI device.

27 Claims, 3 Drawing Sheets

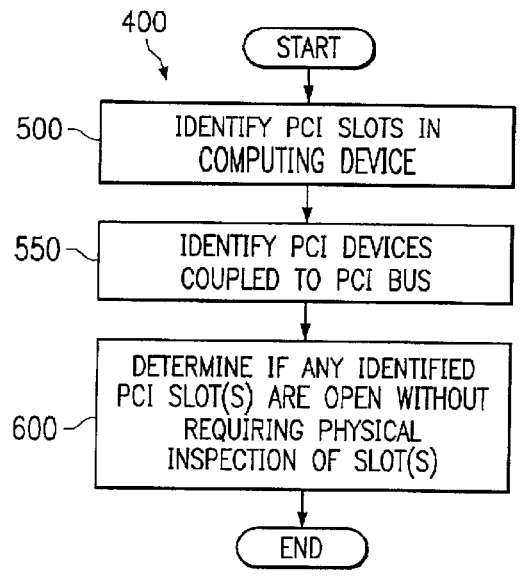

FIG. 2

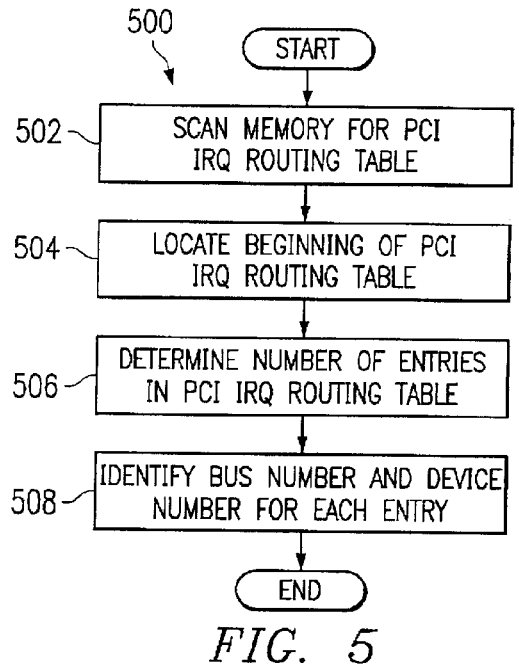

400 → START
500 — IDENTIFY PCI SLOTS IN COMPUTING DEVICE
550 — IDENTIFY PCI DEVICES COUPLED TO PCI BUS
600 — DETERMINE IF ANY IDENTIFIED PCI SLOT(S) ARE OPEN WITHOUT REQUIRING PHYSICAL INSPECTION OF SLOT(S)
END

FIG. 5

500 → START
502 — SCAN MEMORY FOR PCI IRQ ROUTING TABLE
504 — LOCATE BEGINNING OF PCI IRQ ROUTING TABLE
506 — DETERMINE NUMBER OF ENTRIES IN PCI IRQ ROUTING TABLE
508 — IDENTIFY BUS NUMBER AND DEVICE NUMBER FOR EACH ENTRY
END

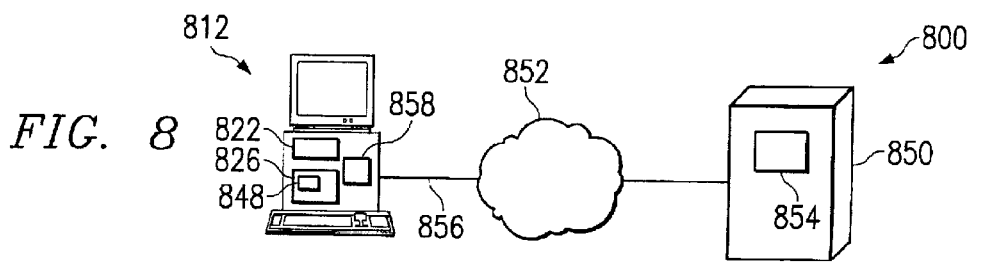

FIG. 8

SYSTEM AND METHOD FOR IDENTIFYING OPEN PERIPHERAL COMPONENT INTERCONNECT (PCI) SLOTS

CROSS-REFERENCE TO OTHER APPLICATIONS

This application shares a common specification with U.S. application Ser. No. 09/773,684 filed on Jan. 31, 2001 for a "System and Method for Identifying a Product for use with a Computing Device."

TECHNICAL FIELD OF THE INVENTION

This invention relates generally to computer systems, and more particularly to a system and method for identifying open peripheral component interconnect (PCI) slots.

BACKGROUND OF THE INVENTION

Computing devices routinely include one or more Peripheral Component Interconnect (PCI) slots. PCI slots are interfaces used by the computer to communicate with peripheral devices, such as Ethernet cards or sound cards, which are inserted or plugged into the PCI slots. The PCI slots typically provide power to the peripheral devices and facilitate communication between the peripheral devices and other components of the computing device.

In order to obtain and install new peripheral devices in the computer, the user often needs to know whether the computing device has any "open" or available PCI slots. For example, a customer who wants to receive Digital Subscriber Line (DSL) service typically needs to obtain a DSL modem, but different DSL modems may communicate with different types of interfaces. The customer needs to determine whether the customer's computer has an available PCI slot. If a PCI slot is available, the customer can order and install a PCI-based DSL modem. Otherwise, the customer needs to order a different type of modem.

Computer users typically have difficulty in identifying whether their computing devices have available PCI slots. For example, identifying available PCI slots typically requires a physical inspection of the computer. Before identifying whether any PCI slots are available, the user often must physically remove at least a portion of the computer casing and locate the PCI slots. It is often a time-consuming process to remove the computer casing, identify the PCI slots, determine if a PCI slot is available, and replace the computer casing. Also, the computer user typically does not possess the technical knowledge needed to identify the available PCI slots. The user may be unaware of what PCI slots look like, or the user may be unable to distinguish PCI slots from other types of interfaces.

One approach to identifying available PCI slots in a computer is to provide identification software to the user. The software helps the user identify the presence or absence of PCI slots by, for example, illustrating the physical steps that the user must take to locate and identify the PCI slots. A problem with this approach is that the user still needs to manually examine the computer, which is a time-consuming process. Also, even with the use of identification software, the user may still incorrectly identify a PCI slot, or the user may still be unable to identify whether a PCI slot is available.

SUMMARY OF THE INVENTION

The present invention recognizes a need for an improved system and method for identifying open peripheral component interconnect (PCI) slots, which reduce or eliminate some or all of the problems and disadvantages associated with prior systems and methods.

In one embodiment of the invention, a system for identifying an available peripheral component interconnect (PCI) slot in a computing device includes a memory operable to store information identifying at least one PCI slot in the computing device. The system also includes a processor coupled to the memory and operable to identify any PCI devices coupled to a PCI bus. The PCI bus is coupled to the PCI slot. The processor is also operable to determine if any of the identified PCI slots are available without requiring physical inspection of the PCI slots. An available PCI slot comprises an identified PCI slot that is not coupled to an identified PCI device.

In another embodiment of the invention, a method for identifying an available peripheral component interconnect (PCI) slot in a computing device includes identifying at least one PCI slot in the computing device. The method also includes identifying any PCI devices coupled to a PCI bus. The PCI bus is coupled to the PCI slot. The method further includes determining if any of the identified PCI slots are available without requiring physical inspection of the PCI slots. An available PCI slot comprises an identified PCI slot that is not coupled to an identified PCI device.

Numerous technical advantages can be gained through various embodiments of the invention. Various embodiments of the invention may exhibit none, some, or all of the following advantages. For example, in one embodiment of the invention, a system is provided that simplifies the identification of one or more open PCI slots in a computing device. Rather than requiring a physical inspection of the computing device, the system may detect and report the existence of an open PCI slot to a user. The user may not need to remove the computer's casing, identify the PCI slots, determine if a PCI slot is available, and replace the computer casing. By reducing or eliminating the need for the user to physically inspect the computing device, the system simplifies the identification of open PCI slots and reduces the time it takes to identify whether a PCI slot is available.

Some embodiments of the invention also reduce or eliminate the likelihood that the user will incorrectly identify an open PCI slot. Because the system detects and reports the existence of an open PCI slot, the user may not need to physically inspect the computing device. The user need not know what PCI slots look like or be able to distinguish PCI slots from other types of interfaces. By reducing or eliminating the need for the user to physically inspect the computing device, the system reduces the likelihood that the user will incorrectly identify an open PCI slot.

Other technical advantages will be readily apparent to one of skill in the art from the attached figures, description, and claims.

BRIEF DESCRIPTION OF THE DRAWINGS

For a more complete understanding of the present invention and the advantages thereof, reference is now made to the following descriptions taken in connection with the accompanying drawings, in which:

FIG. 2 is a block diagram illustrating an exemplary PCI identification table constructed according to the teachings of the present invention;

FIG. 3 is a block diagram illustrating an exemplary PCI enumeration table constructed according to the teachings of the present invention;

FIG. 4 is a flow diagram illustrating an exemplary method for identifying open PCI slots according to the teachings of the present invention;

FIG. 5 is a flow diagram illustrating one particular example of a method for identifying all PCI slots in a computing device according to the teachings of the present invention;

FIG. 8 is a block diagram illustrating an exemplary system for identifying a product for use with a computing device constructed according to the teachings of the present invention.

DETAILED DESCRIPTION OF THE INVENTION

Figure 1:
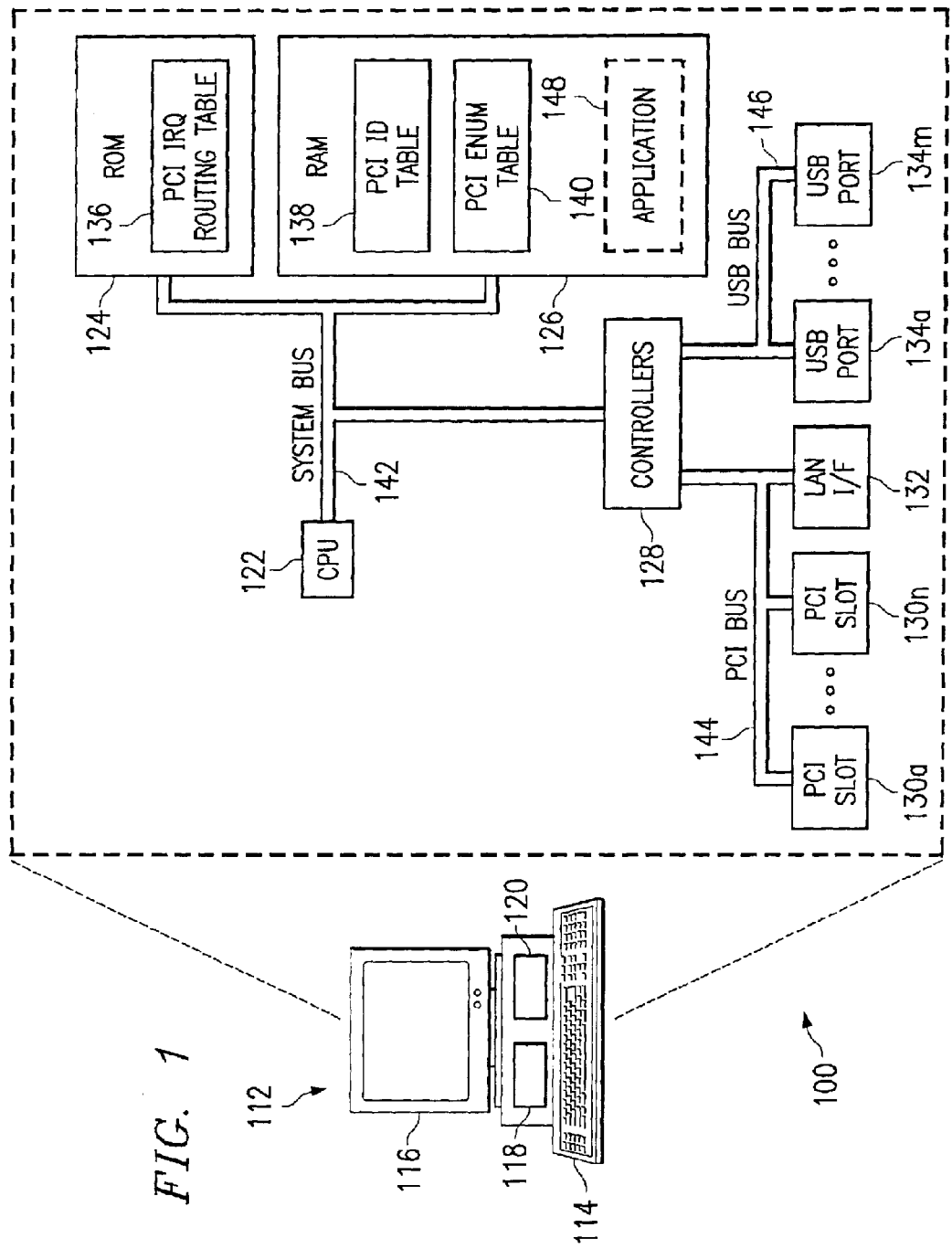
FIG. 1 is a block diagram illustrating an exemplary system for identifying open peripheral component interconnect (PCI) slots constructed according to the teachings of the present invention.

FIG. 1 is a block diagram illustrating an exemplary system 100 for identifying open peripheral component interconnect (PCI) slots 130. In the illustrated embodiment, system 100 includes a host device 112 having one or more PCI slots 130. In one aspect of the invention, system 100 generates a PCI identification table 138, which identifies all PCI slots 130a–130n in host 112. System 100 also generates a PCI enumeration table 140, which identifies the PCI slots 130a–130n that are coupled to PCI devices. System 100 uses PCI enumeration table 140 to determine which PCI slots 130 listed in PCI identification table 138 are coupled to PCI devices. The PCI slots 130 that are listed in PCI identification table 138 but not in PCI enumeration table 140 are "open" slots, or slots that are available to be coupled to a PCI device in host 112.

Host 112 may execute with any of the well-known MS-DOS, PC-DOS, OS-2, MAC-OS, WINDOWS, UNIX, or other appropriate operating systems. Host 112 may comprise, for example, a desktop computer, a laptop computer, or any other computing or communicating device. In the illustrated embodiment, host 112 includes an input device 114, an output device 116, a hard drive 118, an optical storage media 120 or other appropriate volatile or nonvolatile storage and retrieval devices, a processor (CPU) 122, a read-only memory (ROM) 124, a random access memory (RAM) 126, and one or more controllers 128. Other embodiments of host 112 may be used without departing from the scope of the present invention.

Input device 114 may comprise, for example, a keyboard, mouse, graphics tablet, touch screen, pressure-sensitive pad, joystick, light pen, microphone, or other suitable input device. Output device 116 may comprise, for example, a video display, a printer, a disk drive, a plotter, a speaker, or other suitable output device.

Processor 122 is coupled to read-only memory 124, random-access memory 126, and controllers 128 by a system bus 142. In this document, the term "couple" refers to any direct or indirect communication between two or more elements, whether or not those elements are in physical contact with one another. Processor 122 is operable to receive information over system bus 142, process the information, and/or communicate information over system bus 142. Processor 122 may comprise any suitable processor or processors.

Read-only memory 124 is coupled to system bus 142. Read-only memory 124 stores information in system 100, such as data or instructions for processor 122. In one embodiment, read-only memory 124 includes Basic Input/Output System (BIOS) software and information, such as a PCI Interrupt Request (IRQ) routing table 136. Read-only memory 124 may comprise any of a variety of data structures, arrangements, and/or compilations operable to store and facilitate retrieval of information. Read-only memory 124 may, for example, comprise a nonvolatile memory.

Random-access memory 126 is coupled to system bus 142. Random-access memory 126 stores information in system 100, such as data used by processor 122. Random-access memory 126 may comprise any of a variety of data structures, arrangements, and/or compilations operable to store and facilitate retrieval of information. Random-access memory 126 may, for example, comprise a volatile memory.

One or more controllers 128 are coupled to system bus 142. Controllers 128 facilitate communication between system bus 142 and one or more peripheral devices coupled to PCI slots 130, a Local Area Network (LAN) interface 132, and/or Universal Serial Bus (USB) ports 134. In this document, the phrase "peripheral device" refers to any hardware, software, and/or firmware operable to be coupled to a host 112. Peripheral devices include printers, monitors, CD drives, DVD drives, mice, keyboards, sound cards, modems, and any other suitable devices. Controllers 128 may, for example, receive information over a PCI bus 144 from a peripheral device coupled to a PCI slot 130. Controllers 128 may also receive information over system bus 142 and communicate the information over a USB bus 146 to a peripheral device coupled to a USB port 134. One controller 128 may be used to communicate over PCI bus 144, USB bus 146, and/or other busses, or separate controllers 128 may be used. Controllers 128 may comprise any hardware, software, firmware, or combination thereof operable to facilitate communication between host 112 and a peripheral device. In one embodiment, controllers 128 include a PCI controller for communicating over PCI bus 144 and a USB controller for communicating over USB bus 146. Controllers 128 could also include any other suitable controller, such as a Small Computer System Interface (SCSI) controller.

PCI slots 130 are coupled to PCI bus 144. Each PCI slot 130 is operable to be coupled to a PCI device. In this document, the phrase "PCI device" refers to any hardware, software, and/or firmware operable to communicate over PCI bus 144. PCI devices include printers, monitors, CD drives, DVD drives, mice, keyboards, sound cards, modems, hard drives, or any other suitable devices. PCI slot 130 also facilitates communication between the PCI device and PCI bus 144. PCI slot 130 may comprise any hardware, software, firmware, or combination thereof operable to facilitate communication between a PCI device and PCI bus 144.

LAN interface 132 is coupled to controllers 128. LAN interface 132 facilitates communication between controllers 128 and a network. LAN interface 132 may comprise any hardware, software, firmware, or combination thereof operable to facilitate communication between host 112 and a network. LAN interface 132 may, for example, comprise an Ethernet card.

USB ports 134 are coupled to USB bus 146. USB port 134 is operable to be coupled to one or more peripheral devices and to facilitate communication between the peripheral devices and USB bus 146. USB port 134 may comprise any hardware, software, firmware, or combination thereof operable to facilitate communication between a peripheral device and USB bus 146.

System bus 142 is coupled to processor 122, read-only memory 124, random access memory 126, and controllers 128. System bus 142 facilitates communication between processor 122, read-only memory 124, random access memory 126, and controllers 128. System bus 142 may, for example, transport data and instructions between processor 122 and controllers 128. System bus 142 may comprise any suitable bus operable to transfer information between elements in host 112.

PCI bus 144 is coupled to controllers 128 and one or more PCI slots 130. PCI bus 144 is a local bus that facilitates communication between controllers 128 and peripheral PCI devices coupled to PCI slots 130. PCI bus 144 may comprise any suitable local bus operable to transfer information between controllers 128 and PCI slots 130.

USB bus 146 is coupled to controllers 128 and one or more USB ports 134. USB bus 146 is a bus that facilitates communication between controllers 128 and external peripheral devices through USB ports 134. USB bus 146 may comprise any suitable bus operable to transfer information between controllers 128 and USB ports 134.

In one aspect of operation, read-only memory 124 includes PCI Interrupt Request (IRQ) routing table 136. PCI IRQ routing table 136 includes information that identifies each PCI slot 130 in host 112. PCI IRQ routing table 136 may, for example, include information identifying PCI bus 144, a device number for each PCI slot 130 coupled to PCI bus 144, and a slot number for each PCI slot 130 coupled to PCI bus 144. In one embodiment, PCI IRQ routing table 136 is identified by a "$PIR" string at the beginning of the table. In that particular example, PCI IRQ routing table 136 is stored in read-only memory 124 between memory addresses F0000h and FFFFFh (hexadecimal). Other identifying strings and/or memory locations may be used without departing from the scope of the present invention.

To determine whether any PCI slots 130 are available in host 112, processor 122 generates a PCI identification table 138 and a PCI enumeration table 140. To generate PCI identification table 138, processor 122 locates PCI IRQ routing table 136 in read-only memory 124. Processor 122 may, for example, scan read-only memory 124 for a "$PIR" string, which represents the beginning of PCI IRQ routing table 136. Processor 122 accesses the information in PCI IRQ routing table 136, extracts the information about PCI slots 130, and generates PCI identification table 138. The information stored in PCI identification table 138 identifies PCI slots 130a–130n in host 112. To generate PCI enumeration table 140, controllers 128 enumerate PCI devices coupled to PCI bus 144, which includes identifying PCI slots 130 that are coupled to PCI devices. In one embodiment, host 112 executes with a WINDOWS NT operating system, and system 100 enumerates PCI devices coupled to PCI bus 144 using a HalGetBusData function. In another embodiment, host 112 executes with a WINDOWS 98 operating system, and system 100 enumerates PCI devices using a system registry. Other methods of enumerating devices on PCI bus 144 may be used without departing from the scope of the present invention. After enumerating devices coupled to PCI bus 144, processor 122 compares PCI identification table 138 and PCI enumeration table 140. Processor 122 identifies which PCI slots 130 are not coupled to PCI devices, and these PCI slots 130 are "open" or available to be coupled to a PCI device.

The ability to identify open PCI slots 130 may be useful in many ways, such as in determining what product to install in computer 112. In this document, the term "product" refers to any hardware, software, and/or firmware that may be coupled to or used in conjunction with host 112. For example, a modem could be coupled to a PCI slot 130, LAN interface 132, or a USB port 134. In one embodiment, processor 122 may identify whether host 112 includes any available PCI slots 130. Processor 122 may also determine whether host 112 includes a LAN interface 132 and/or a USB port 134. Using this information, processor 122 may recommend the type of modem that may be installed in host 112. In one embodiment, processor 122 may recommend a USB modem if host 112 supports the USB standard. If not, processor 122 may determine whether any PCI slots 130 are open and recommend a PCI-based modem if a PCI slot 130 is available. Otherwise, processor 122 may determine whether a LAN interface 132 is present and recommend a LAN-based modem. If processor 122 cannot identify a suitable type of product, processor 122 may instruct the user to contact a technician or customer support personnel.

Although FIG. 1 illustrates one embodiment of system 100, various changes may be made without departing from the scope of the present invention. For example, LAN interface 132 could be coupled to USB bus 146 instead of PCI bus 144. Also, any number of PCI slots 130, LAN interfaces 132, and/or USB ports 134 may be used in host 112. Further, PCI IRQ routing table 136, PCI identification table 138, and/or PCI enumeration table 140 may reside in any memory internal to or accessible by host 112. In addition, although system 100 illustrates host 112 as comprising a desktop computer, host 112 may comprise any suitable computing device, such as a laptop computer or server. Other changes may be made without departing from the scope of the present invention.

FIG. 2 is a block diagram illustrating an exemplary PCI identification table 238. In this document, the term "table" refers to any arrangement, compilation, and/or data structure operable to store and facilitate retrieval of information. PCI identification table 238 may be useful, for example, in system 100 of FIG. 1. In the illustrated embodiment, PCI identification table 238 includes at least one entry 250. An entry 250 in PCI identification table 238 corresponds to a PCI slot 130 in system 100, and each entry 250 includes a bus number 252, a device number 254, and a slot number 256. The values and number of entries 250 contained in PCI identification table 238 are for illustration only. Any suitable number of entries 250 and any suitable values may be used without departing from the scope of the present invention.

Bus number 252 identifies PCI bus 144 in system 100. In the illustrated embodiment, PCI bus 144 is identified by the number zero, although PCI bus 144 may be identified using any suitable indicator. Also, if multiple PCI busses 144 are used in system 100, each bus 144 may be identified by a different bus number 250.

Device number 254 identifies a device number assigned to each PCI slot 130 in host 112. A device number 254 may be used, for example, to address a device coupled to PCI slot 130. In one embodiment, device numbers 254 are assigned to PCI slots 130 by the BIOS of host 112. PCI slots 130 may be assigned any suitable device number 254. In one embodiment, different device numbers 254 may be used to identify the same PCI slot 130. For example, when a single hardware device performs multiple functions, such as a sound card having a SCSI controller, two device numbers 254 could be assigned to the PCI slot 130 that is coupled to the sound card.

Slot number 256 identifies whether an entry 250 in PCI identification table 238 identifies a system-board device or a PCI slot 130. A slot number 256 of zero indicates that entry 250 corresponds to a system-board device, or a device that is hardwired to the motherboard of host 112. A slot number 256 having a non-zero value represents an "add-in slot," or a PCI slot 130 in host 112 that can be coupled to a PCI device. In one embodiment, an entry 250 having a slot number 256 of zero is not an available PCI slot 130, and an entry 250 having a non-zero slot number 256 may or may not be an available PCI slot 130.

In one embodiment, processor 122 generates PCI identification table 238 using information from PCI IRQ routing table 136. For example, processor 122 may scan read-only memory 124 for a "$PIR" string, which represents the beginning of PCI IRQ routing table 136. After locating table 136 in read-only memory 124, processor 122 may extract the bus number 252, device number 254, and slot number 256 for each entry in PCI IRQ routing table 136. Using this information, processor 122 may generate PCI identification table 238.

Although FIG. 2 illustrates one embodiment of PCI identification table 238, other embodiments may be used without departing from the scope of the present invention. For example, although FIG. 2 illustrates a table 238 storing the information in entries 250, other data structures may be used in system 100. The information from entries 250 could, for example, be stored in a linked list, multiple arrays, or any other suitable data structure operable to store and facilitate retrieval of information.

FIG. 3 is a block diagram illustrating an exemplary PCI enumeration table 340. PCI enumeration table 340 may be useful, for example, in system 100 of FIG. 1. In the illustrated embodiment, PCI enumeration table 340 includes zero or more entries 350. An entry 350 in PCI enumeration table 340 corresponds to a PCI device coupled to PCI bus 144 in system 100. Each entry 350 in PCI enumeration table 340 includes a bus number 352 and a device number 354. The values and number of entries 350 contained in PCI enumeration table 340 are for illustration only. Any suitable number of entries 350 and any suitable values may be used without departing from the scope of the present invention.

Bus number 352 identifies PCI bus 144 in system 100. Device number 354 identifies a device number assigned to a PCI device coupled to PCI bus 144. Device numbers 354 in entries 350 may have any suitable value, and different device numbers 354 may be used to identify the same PCI device.

In one embodiment, processor 122 generates PCI enumeration table 340 using information collected by controllers 128. For example, controllers 128 may enumerate PCI devices coupled to PCI bus 144 using a HalGetBusData function or a system registry. During enumeration, controllers 128 identify the PCI devices coupled to PCI bus 144. For each device, controllers 128 identify the bus number 352 of the device and the device number 354 of the device. Processor 122 collects this information and generates PCI enumeration table 340.

Although FIG. 3 illustrates a table 340 storing the information in entries 350, other data structures may be used to store the information without departing from the scope of the present invention. The information from entries 350 could, for example, be stored in a linked list, multiple arrays, or any other suitable data structure operable to store and facilitate retrieval of information. Also, because the number of entries 350 in PCI enumeration table 340 is related to the number of PCI devices coupled to PCI bus 144, table 340 may contain any number of entries 350.

In one aspect of operation, processor 122 generates PCI identification table 238 and PCI enumeration table 340. To identify open PCI slots 130 in host 112, processor 122 may compare entries 250 and 350 in tables 238 and 340. In one embodiment, processor 122 compares the bus number 352 and device number 354 of an entry 350 in PCI enumeration table 340 with the entries 250 in PCI identification table. If an entry 250 in table 238 has a bus number 252 and a device number 254 that matches the bus number 352 and device number 354 of entry 350 in table 340, entry 250 is removed from table 238. In this instance, entry 250 does not correspond to an open PCI slot 130 because an enumerated PCI device is present in the PCI slot 130. Processor 122 repeats this process for each entry 350 in table 340, and any remaining entries 250 in table 238 represent open PCI slots 130 in system 100. Alternatively, instead of removing entries 250 from table 238, system 100 could construct a new table that stores information identifying open PCI slots 130.

Using the tables of FIGS. 2 and 3 as an example, entry 350$k$ has a bus number 352 of "0" and a device number 354 of "f". Processor 122 compares bus number 352 and device number 354 to entries 250 in table 238 of FIG. 2, and processor 122 finds that entry 250$l$ in table 238 has a bus number 252 of "0" and a device number 254 of "f". Entry 250$l$ is removed from table 238 because it is not an available PCI slot 130. After repeating this process for each entry 350, only entry 250$k$ would remain in table 238. Entry 250$k$ corresponds to slot 3, which is an available PCI slot 130. Because slot 3 is present in host 112 but is not coupled to a PCI device, slot 3 is an open PCI slot 130.

In the illustrated embodiment, entry 250$n$ has a slot number 256 of zero. An entry 250 having a slot number 256 of zero corresponds to a hardwired device on the motherboard of host 112. That entry 250 does not represent an available PCI slot 130. In one embodiment, processor 122 could allow entry 250$n$ to remain in table 238. Entry 250$n$ would eventually be removed from table 238 when processor 122 compares it to entry 350$m$. In another embodiment, system 100 could remove entries 250 having a slot number 256 of zero before comparing entries 250 and 350.

In the illustrated embodiment, entry 350$a$ in table 340 contains values of zero for bus number 352 and device number 354. In one embodiment, devices such as a PCI bus controller 128 may be enumerated as a device on PCI bus 144. In a particular embodiment, controller 128 may be enumerated as having a bus number 352 of zero and a device number 354 of zero. The controller 128 is not a physical PCI slot 130 in host 112, so system 100 may ignore this entry 350 in table 340 when identifying open PCI slots 130 in host 112.

FIG. 4 is a block diagram illustrating an exemplary method 400 for identifying open PCI slots 130. System 100 identifies PCI slots 130 in host 112 at step 500. This may include, for example, processor 122 scanning read-only memory 124 and locating PCI IRQ routing table 136. This may also include processor 122 extracting a bus number 252 and a device number 254 for each PCI slot 130 from PCI IRQ routing table 136, and storing the bus numbers 252 and device numbers 254 in PCI identification table 238. System 100 identifies PCI devices coupled to PCI bus 144 at step 550. This may include, for example, controllers 128 enumerating the PCI devices by identifying a bus number 352 and a device number 354 of any PCI device coupled to PCI bus 144. This may also include processor 122 storing the bus numbers 352 and device numbers 354 in PCI enumeration table 340.

System 100 determines, without requiring physical inspection of the PCI slots 130, which identified PCI slots 130 are available at step 600. This may include, for example, processor 122 comparing the entries 250 in PCI identification table 238 and the entries 350 in PCI enumeration table 340. This may also include processor 122 identifying any entry 250 in PCI identification table 238 that does not have a matching entry 350 in PCI enumeration table 340.

Although FIG. 4 illustrates one embodiment of a method 400 for identifying open PCI slots 130, various changes may be made to method 400 without departing from the scope of the present invention. For example, system 100 may identify PCI devices coupled to PCI bus 144 before identifying PCI slots 130 in host 112.

FIG. 5 is a flow diagram illustrating one particular example of a method 500 for identifying all PCI slots 130 in a computing device 112. System 100 scans a memory for a PCI IRQ routing table 136 at step 502. This may include, for example, processor 122 scanning read-only memory 124 between memory addresses F0000h and FFFFFh (hexadecimal). System 100 locates the PCI IRQ routing table 136 at step 504. This may include, for example, processor 122 locating a "$PIR" string in read-only memory 124.

System 100 determines the number of entries in PCI IRQ routing table 136 at step 506. In one embodiment, PCI IRQ routing table 136 includes an entry that defines the size of PCI IRQ routing table 136 in bytes. Also, PCI IRQ routing table 136 may contain thirty-two bytes of information in addition to the entries, and each entry may contain sixteen bytes of information. In that particular example, processor 122 may determine the number of entries in PCI IRQ routing table 136 using the formula:

Number of entries=(Size of table−32)/16.

The number of entries represents the number of PCI slots 130 and system-board devices coupled to PCI bus 144 in host 112.

System 100 identifies the bus number 252 and device number 254 for each entry at step 508. This may include, for example, processor 122 scanning PCI IRQ routing table 136 and extracting the bus number 252 and device number 254 for each entry. System 100 may store this information in PCI identification table 238 or any other suitable data structure.

Although FIG. 5 illustrates one embodiment of a method 500 for identifying PCI slots 130 in a host 112, various changes may be made to method 500 without departing from the scope of the present invention. For example, system 100 may identify the number of entries in PCI IRQ routing table 136 during or after the scan of table 136, such as by counting the number of entries found in table 236. Also, system 100 may extract additional information about each PCI slot 130 from PCI IRQ routing table 136, such as a slot number 256 for each entry.

Figure 6:
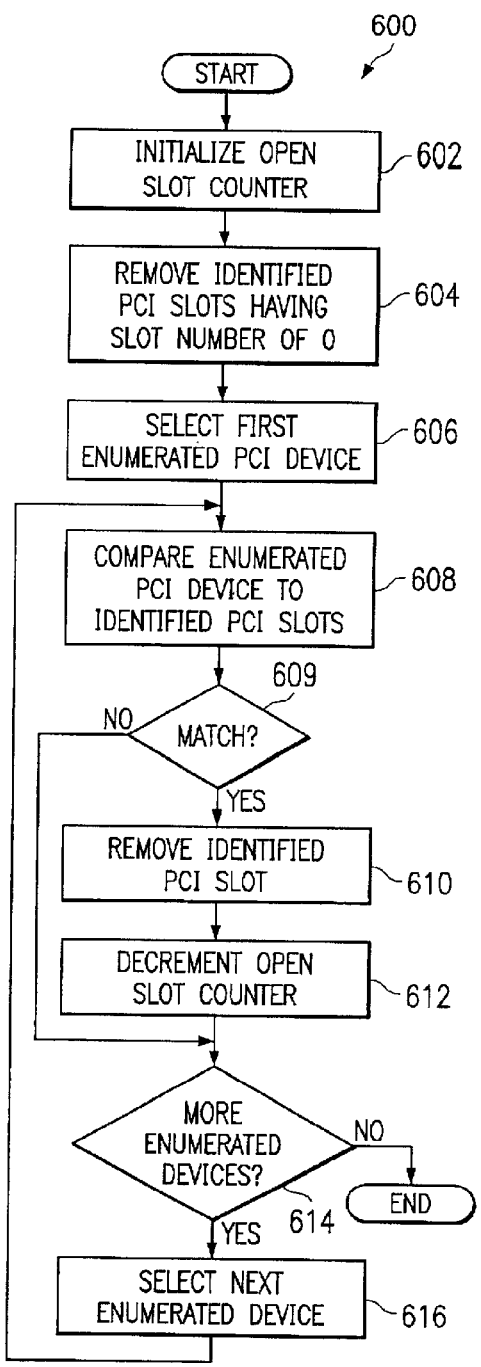
FIG. 6 is a flow diagram illustrating one particular example of a method for determining whether identified PCI slots are open according to the teachings of the present invention.

FIG. 6 is a flow diagram illustrating one particular example of a method 600 for determining whether identified PCI slots 130 are open. System 100 initializes an open slot counter at step 602. This may include, for example, processor 122 setting the counter to a value equal to the number of entries 250 in table 238. System 100 removes any identified PCI slots 130 having a slot number of zero at step 604. This may include, for example, processor 122 scanning table 238 and removing any entries 250 having a slot number 256 of zero since these entries 250 do not correspond to an open PCI slot 130. This may also include processor 122 decrementing the open slot counter for each entry 250 removed. System 100 selects the first enumerated PCI device at step 606. This may include, for example, processor 122 selecting the first entry 350 in PCI enumeration table 340.

System 100 compares the enumerated PCI device to the identified PCI slots 130 at step 608. This may include, for example, processor 122 comparing the bus number 352 and device number 354 of entry 350 to the bus numbers 252 and device numbers 254 of entries 250. If system 100 finds an entry 250 having a bus number 252 and device number 254 that matches the bus number 352 and device number 354 of entry 350, system 100 identifies a match at step 609. In that case, the PCI slot 130 corresponding to entry 250 is not an available slot because the PCI slot 130 is coupled to a PCI device. System 100 removes the identified PCI slot 130 at step 610. This may include, for example, processor 122 removing entry 250 from table 238. System 100 also decrements the open slot counter at step 612.

After decrementing the open slot counter at step 612, or if system 100 found no match at step 609, system 100 determines whether another enumerated PCI device exists at step 614. This may include, for example, processor 122 determining whether another entry 350 exists in PCI enumeration table 340. If another PCI device exists, system 100 selects the next PCI device at step 616 and returns to step 608 to process this PCI device.

If no more enumerated PCI devices exist at step 614, method 600 ends. At this point, any remaining entries 250 in table 238 identify open or available PCI slots 130. Also, the value of the open slot counter should equal the number of available PCI slots 130.

Although FIG. 6 illustrates one embodiment of a method 600 for determining whether identified PCI slots 130 are open, various changes may be made without departing from the scope of the present invention. For example, entries 250 and 350 in tables 238 and 340 could be sorted in order of increasing or decreasing device number 254 and 354 to simplify the determination at step 609. Also, in another embodiment, step 604 could be omitted because devices having a slot number 256 of zero should appear in PCI enumeration table 340 as enumerated PCI devices. Further, in the illustrated embodiment, system 100 compares the bus number 352 and device number 354 of each enumerated PCI device to the bus numbers 252 and device numbers 254 of identified PCI slots 130. In another embodiment, system 100 may compare the bus number 252 and device number 254 of each identified PCI slot 130 to the bus numbers 352 and device numbers 354 of enumerated PCI devices.

Figure 7:
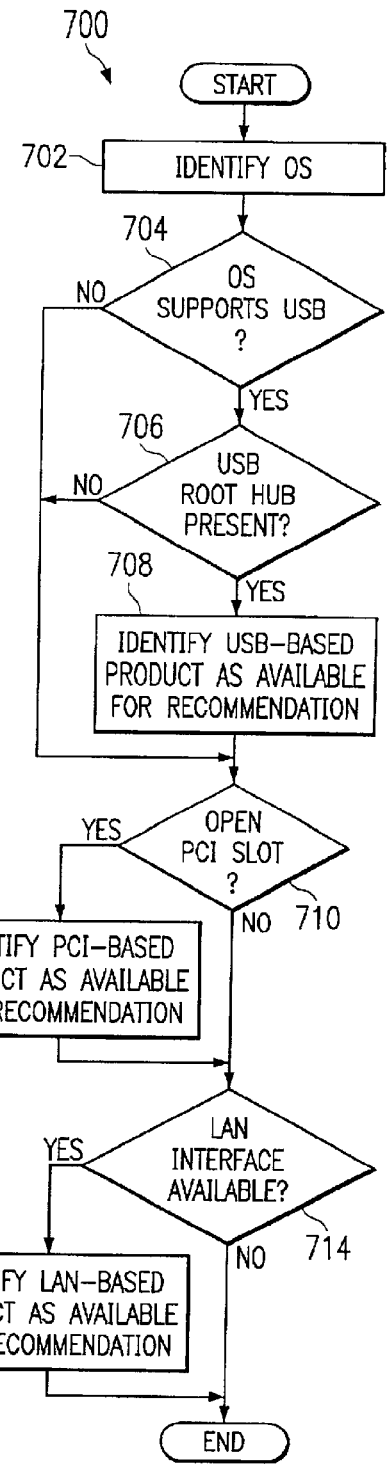
FIG. 7 is a flow diagram illustrating an exemplary method for identifying a product for use with a computing device according to the teachings of the present invention.

FIG. 7 is a flow diagram illustrating an exemplary method 700 for identifying a product for use with a computing device 112. The method 700 begins at step 702 where system 100 identifies the operating system of host 112. This may include, for example, processor 122 determining whether host 112 is executing with WINDOWS 98 or WINDOWS 98 Second Edition, or whether host 112 is executing with another operating system. System 100 determines whether the operating system of host 112 supports the use of a USB bus 146 at step 704. For example, the WINDOWS 98 operating system supports a USB bus 146, while the WINDOWS 95, WINDOWS NT 3.51, and WINDOWS NT 4.0 operating systems do not.

If the operating system supports the use of a USB bus 146, system 100 determines if a USB root hub is present at step 706. This may include, for example, processor 122 accessing a system registry to determine if a USB root hub is installed on the motherboard of host 112 or attached to host 112 as an adapter card. If a USB root hub is present, system 100 identifies a USB-based product as available for recommendation at step 708. Alternatively, system 100 could automatically recommend a USB-based product at this point. A USB device may be coupled to a USB port 134 and used with host 112.

System 100 can also determine whether any PCI slots 130 are available at step 710. This may include any method of determining whether a PCI slot 130 is open, such as processor 122 executing method 400 illustrated in FIG. 4. If any PCI slots 130 are available, system 100 identifies a PCI-based product as available for recommendation at step 712. Alternatively, system 100 could automatically recommend a PCI-based product at this point. A PCI device may be coupled to a PCI slot 130 and used with host 112.

System 100 can further determine if a LAN interface 132 is available for use in host 112 at step 714. This may include, for example, system 100 prompting a user to enter whether host 112 includes a LAN interface 132, or processor 122 automatically detecting the presence or absence of LAN interface 132. If a LAN interface 132 is present, system 100 identifies a LAN-based product as available for recommendation at step 716. Alternatively, system 100 could automatically recommend a LAN-based product at this point. If no product has been identified, method 700 ends without recommending a product. A user of host 112 may be advised to contact a technician or customer support personnel for assistance in identifying the type of product to install in host 112.

Although FIG. 7 illustrates one embodiment of a method 700 for identifying a product for use with a computing device 112, various changes may be made to method 700 without departing from the scope of the present invention. For example, system 100 may perform testing steps 704, 706, 710, and 714 in any order. In another embodiment, system 100 may determine whether a LAN interface 132 is available before testing whether any PCI slots 130 are available. Also, while FIG. 7 illustrates system 100 testing for three types of interfaces, system 100 may check whether any number of interfaces are available. For example, system 100 may determine whether any USB ports 134 or PCI slots 130 are available, without determining if a LAN interface 132 is present. In addition, system 100 may take any suitable action after identifying one or more available interfaces. In one embodiment, system 100 may present a user with a list of all identified products and allow the user to select one or more of the products. In another embodiment, system 100 may recommend one or more of the identified products to the user using any suitable ranking or rating criteria. Other changes may be made to method 700 without departing from the scope of the present invention.

The process described in FIG. 7 could be hardwired into host 112 or could exist all or in part as an application 148 residing on host 112 or otherwise accessible to host 112. Where all or a part of the process is executed through application 148, host 112 could access application 148, for example, by loading application 148 from a CD, a floppy disk, or any other computer readable medium. Alternatively, host 112 could access an application 148 residing at a remote site, such as a network server.

FIG. 8 is a block diagram illustrating an exemplary system 800 for identifying a product for use with a computing device 812. In the illustrated embodiment, system 800 includes a host 812 and a server 850 coupled to a network 852. Other embodiments of system 800 may be used without departing from the scope of the present invention.

Host 812 and server 850 are coupled to network 852. Host 812 may be the same or similar to host 112 of FIG. 1. Like Host 112 of FIG. 1, Host 812 may include a hard drive 822. Server 850 is operable to communicate with host 812 and to identify a product for use with host 812. In one embodiment, an application 848 resides at server 850, and host 812 downloads and executes the application 848 to identify available interfaces in host 812 and/or identify a product for use with host 812. In one embodiment, server 850 includes a web portal 854, and a user of host 812 may access the web portal 854 through network 852. Server 850 may comprise any suitable hardware, software, firmware, or combination thereof operable to communicate with host 812 over network 852.

Network 852 is coupled to host 812 and server 850 by communication links 856. Network 852 may include any suitable wireline or wireless system that supports communication between network elements using ground-based and/or space-based components. For example, network 852 may be a public switched telephone network (PSTN), an integrated services digital network (ISDN), a local area networks (LAN), a wide area network (WAN), a global computer network such as the Internet, or any other communications system or systems at one or more locations.

Communication links 856 facilitate communication between host 812 or server 850 and network 852. Communication link 856 may comprise any communications medium operable to facilitate communication of analog and/or digital signals using ground-based and/or space-based components. Communication link 856 may, for example, comprise a twisted-pair copper telephone line or a fiber optic line.

In one embodiment, a user of host 812 may access web portal 854 of a product supplier and download an application 848 to host 812. The application 848 may be the same or similar to application 148 of FIG. 1. The user may choose to execute the application 848, or the application 848 may be a self-executing application. The application 848 may then identify the types of interfaces available in host 812. In a particular embodiment, application 848 identifies whether any PCI slots, LAN interfaces, and/or USB ports are available in host 812. Application 848 uses this information to identify or recommend one or more products for use with host 812. The application 848 may, for example, use the same or similar method illustrated in FIG. 7 for identifying a product.

Application 848 may take any appropriate steps after identifying the types of interfaces available in host 812. The application 848 may, for example, present the user with a list of all identified products and allow the user to select one or more of the products. Application 848 may also recommend one of the identified products to the user, or application 848 may select a product without user input. In addition, after a product is selected, application 848 may communicate an identification of the selected product to server 850. Server 850 may then take any suitable action, such as generating an order for the product, collecting billing information from the user, estimating a delivery time for the product, and/or informing the user of the estimated delivery time.

As a particular example, host 812 may include a 56K modem 858, and the user of host 812 may wish to obtain a Digital Subscriber Line (DSL) modem from a DSL service provider. The user may access web portal 854 of the DSL service provider and download application 848 to host 812. Host 812 may execute the application 848, and the application 848 identifies the types of interfaces available in host 812. The application 848 may also identify one or more types of DSL modems for use with host 812, recommend a type of DSL modem, or automatically select a modem. Application 848 may also communicate the selected modem type to the web portal 854, and delivery of the DSL modem can be arranged. In one embodiment, application 848 may treat the interface coupled to modem 858 as an available slot and instruct the user of host 812 to insert the DSL modem into the slot occupied by the 56K modem.

Although FIG. 8 illustrates one embodiment of a system 800 for identifying a product for use with a computing device 812, various changes may be made to system 800 without departing from the scope of the present invention. For example, although application 848 is described as identifying and/or recommending a product for use with host 812, this functionality may be divided between application 848 and server 850. In one embodiment, application 848 may identify the types of interfaces available in host 812 and communicate this information to server 850. in this embodiment, server 850 may identify one or more products for use with host 812 and communicate this information to host 812. Also, application 848 may be delivered to host 812 using any suitable method. As an example, application 848 may be placed on a CD, which is then placed into a CD drive 826 in host 812. Other changes may be made to system 800 without departing from the scope of the present invention.

Although the present invention has been described in several embodiments, a myriad of changes, variations, alterations, transformations, and modifications may be suggested to one skilled in the art, and it is intended that the present invention encompass such changes, variations, alterations, transformations, and modifications as fall within the spirit and scope of the appended claims.

What is claimed is:

1. A method executed internal to a computing device for identifying an available peripheral component interconnect (PCI) slot in the computing device, comprising:
    identifying a plurality of PCI slots in the computing device;
    identifying at least one PCI device coupled to a PCI bus, the PCI bus coupled to the PCI slot; and
    identifying to a user of the computing device one or more unoccupied PCI slots without requiring physical inspection of the PCI slots, the one or more unoccupied PCI slots identified by comparing the plurality of PCI slots in the computing device with the at least one PCI device coupled the PCI bus, the one or more unoccupied PCI slots comprising an identified PCI slot that is not coupled to an identified PCI device.

2. The method of claim 1, wherein identifying a plurality of PCI slots in the computing device comprises identifying a bus number and a device number for the plurality of PCI slots using a PCI Interrupt Request (IRQ) routing table.

3. The method of claim 2, further comprising locating the routing table in a read-only memory in the computing device.

4. The method of claim 1, wherein identifying the at least one PCI device coupled to a PCI bus comprises identifying a bus number and a device number for each PCI device coupled to the PCI bus.

5. The method of claim 1, wherein identifying to a user of the computing device one or more unoccupied PCI slots comprises comparing a bus number and a device number of at least one of the identified PCI slots to a bus number and a device number of the at least one of the identified PCI devices.

6. The method of claim 1, further comprising determining how many identified PCI slots are unoccupied.

7. The method of claim 1, wherein identifying a plurality of PCI slots in the computing device comprises generating a list of identified PCI slots associated with the computing device.

8. The method of claim 1, wherein identifying at least one PCI device coupled to a PCI bus comprises generating a list of one or more PCI devices coupled to the PCI bus.

9. A system for identifying an available peripheral component interconnect (PCI) slot in a computing device by executing an application internal to the computing device, comprising:
    at least one computer readable medium; and
    software encoded on the at least one computer readable medium and operable when executed by a processor to:
        identify a plurality of PCI slots in the computing device;
        identify at least one PCI device coupled to a PCI bus, the PCI bus coupled to the PCI slot; and
        identify to a user of the computing device one or more unoccupied PCI slots without requiring physical inspection of the PCI slots, the one or more unoccupied PCI slots identified by comparing the plurality of PCI slots in the computing device with the at least one PCI device coupled the PCI bus, the one or more unoccupied PCI slots comprising an identified PCI slot that is not coupled to an identified PCI device.

10. The system of claim 9, wherein the software is operable to identify a plurality of PCI slots in the computing device by identifying a bus number and a device number for the plurality of PCI slots using a PCI Interrupt Request (IRQ) routing table.

11. The system of claim 10, wherein the software is further operable to locate the routing table in a read-only memory in the computing device.

12. The system of claim 9, wherein the software is operable to identify the at least one PCI device coupled to a PCI bus by identifying a bus number and a device number for each PCI device coupled to the PCI bus.

13. The system of claim 9, wherein the software is operable to identify to a user of the computing device one or more unoccupied PCI slots by comparing a bus number and a device number of at least one of the identified PCI slots to a bus number and a device number of the at least one of the identified PCI devices.

14. The system of claim 9, wherein the software is further operable to determine how many identified PCI slots are unoccupied.

15. The system of claim 9, wherein the software is operable to generate a list of identified PCI slots associated with the computing device to identify a plurality of PCI slots in the computing device.

16. The system of claim 9, wherein the software is operable to generate a list of one or more PCI devices coupled to the PCI bus to identify at least one PCI device coupled to a PCI bus.

17. A system for identifying an available peripheral component interconnect (PCI) slot in a computing device by executing a process internal to the computing device, the system comprising:
    a memory operable to store information identifying a plurality of PCI slots in the computing device; and
    a processor coupled to the memory and operable to:
        identify at least one PCI device coupled to a PCI bus, the PCI bus coupled to the PCI slot; and
        identify to a user of the computing device one or more unoccupied PCI slots without requiring physical inspection of the PCI slots, the one or more unoccupied PCI slots identified by comparing the plurality of PCI slots in the computing device with the at least one PCI device coupled the PCI bus. the one or more unoccupied PCI slots comprising an identified PCI slot that is not coupled to an identified PCI device.

18. The system of claim 17, wherein the processor is operable to generate the information identifying a plurality of PCI slots in the computing device by identifying a bus number and a device number for the plurality of PCI slots using a PCI Interrupt Request (IRQ) routing table.

19. The system of claim 18, wherein the processor is further operable to locate the routing table in a read-only memory in the computing device.

20. The system of claim 17, wherein the processor is operable to identify the at least one PCI device coupled to a PCI bus by identifying a bus number and a device number for each PCI device coupled to the PCI bus using a bus controller.

21. The system of claim 17, wherein the processor is operable to identify to a user of the computing device one or more unoccupied PCI slots by comparing a bus number and a device number of at least one of the identified PCI slots to a bus number and a device number of the at least one of the identified PCI devices.

22. The system of claim 17, wherein the processor is further operable to determine how many identified PCI slots are unoccupied.

23. A method executed internal to a computing device for identifying an available peripheral component interconnect (PCI) slot in the computing device, comprising:
 locating a PCI Interrupt Request (IRQ) routing table;
 identifying a bus number and a device number for each of a plurality of PCI slots in the computing device using the routing table;
 identifying a bus number and a device number for at least one PCI device coupled to a PCI bus of the computing device, the PCI bus coupled to the PCI slot;
 comparing the bus number and the device number for each of the identified PCI slots to the bus number and the device number of at least one of the identified PCI devices coupled to the PCI bus; and
 based on the comparison of the bus number and the device number for at least one of the identified PCI slots and the bus number and the device number of the at least one of the identified PCI devices coupled to the PCI bus, determining if any of the identified PCI slots in the computing device are unoccupied, an unoccupied PCI slot comprising an identified PCI slot that is not coupled to an identified PCI device.

24. A system for identifying an available peripheral component interconnect (PCI) slot in a computing device by executing an application internal to the computing device, the system comprising:
 at least one computer readable medium; and
 software encoded on the at least one computer readable medium and operable when executed by a processor to:
  locate a PCI Interrupt Request (IRQ) routing table;
  identify a bus number and a device number for each of a plurality of PCI slots in the computing device using the routing table;
  identify a bus number and a device number for at least one PCI device coupled to a PCI bus of the computing device, the PCI bus coupled to the PCI slot;
  compare the bus number and the device number for each of the plurality of PCI slots to the bus number and the device number of the at least one PCI device coupled to the PCI bus; and
  based on the comparison of the bus number and the device number for at least one of the plurality of PCI slots and the bus number and the device number of the at least one PCI device coupled to the PCI bus, determine if any of the identified PCI slots in the computing device are unoccupied, an unoccupied PCI slot comprising an identified PCI slot that is not coupled to an identified PCI device.

25. A system for identifying an available peripheral component interconnect (PCI) slot in a computing device by executing a process internal to the computing device, the system comprising:
 a memory containing a PCI Interrupt Request (IRQ) routing table; and
 a processor coupled to the memory and operable to:
  locate the routing table in the memory;
  identify a bus number and a device number each of a plurality of PCI slots in the computing device using the routing table;
  identify a bus number and a device number for at least one PCI device coupled to a PCI bus of the computing device, the PCI bus coupled to the PCI slot;
  compare the bus number and the device number for each of the plurality of identified PCI slots to the bus number and the device number of the at least one PCI device coupled to the PCI bus; and
  based on the comparison of the bus number and the device number for at least one of the plurality of identified PCI slots and the bus number and the device number of the at least one PCI device coupled to the PCI bus, determine if any of the identified PCI slots in the computing device are unoccupied, an unoccupied PCI slot comprising an identified PCI slot that is not coupled to an identified PCI device.

26. A method executed internal to a computing device for identifying an available peripheral component interconnect (PCI) slot in the computing device, comprising:
 generating a list of PCI slots associated with the computing device;
 generating a list of one or more PCI devices coupled to a PCI bus of the computing device, the PCI bus coupled to the PCI slot; and
 identifying an unoccupied PCI slot without requiring physical inspection of any PCI slots in the computing device, the unoccupied PCI slot identified by comparing the list of PCI slots associated with the computing device with the list of one or more PCI devices coupled to the PCI bus, an unoccupied PCI slot comprising an identified PCI slot that is not coupled to an identified PCI device.

27. A method executed internal to a computing device for identifying an available peripheral component interconnect (PCI) slot in the computing device, comprising:
 generating an identification table identifying a plurality of PCI slots associated with the computing device;
 generating an enumeration table enumerating one or more PCI devices coupled to a PCI bus of the computing device, the PCI bus coupled to the PCI slot; and
 identifying an unoccupied PCI slot without requiring physical inspection of any PCI slots in the computing device, the unoccupied PCI slot identified by comparing the identification table and the enumeration table, an unoccupied PCI slot comprising an identified PCI slot that is not coupled to any enumerated PCI device.

* * * * *